April 18, 1961 J. J. KOSACH 2,980,436
SINGLE WHEEL SKATE
Filed June 6, 1960 3 Sheets-Sheet 1
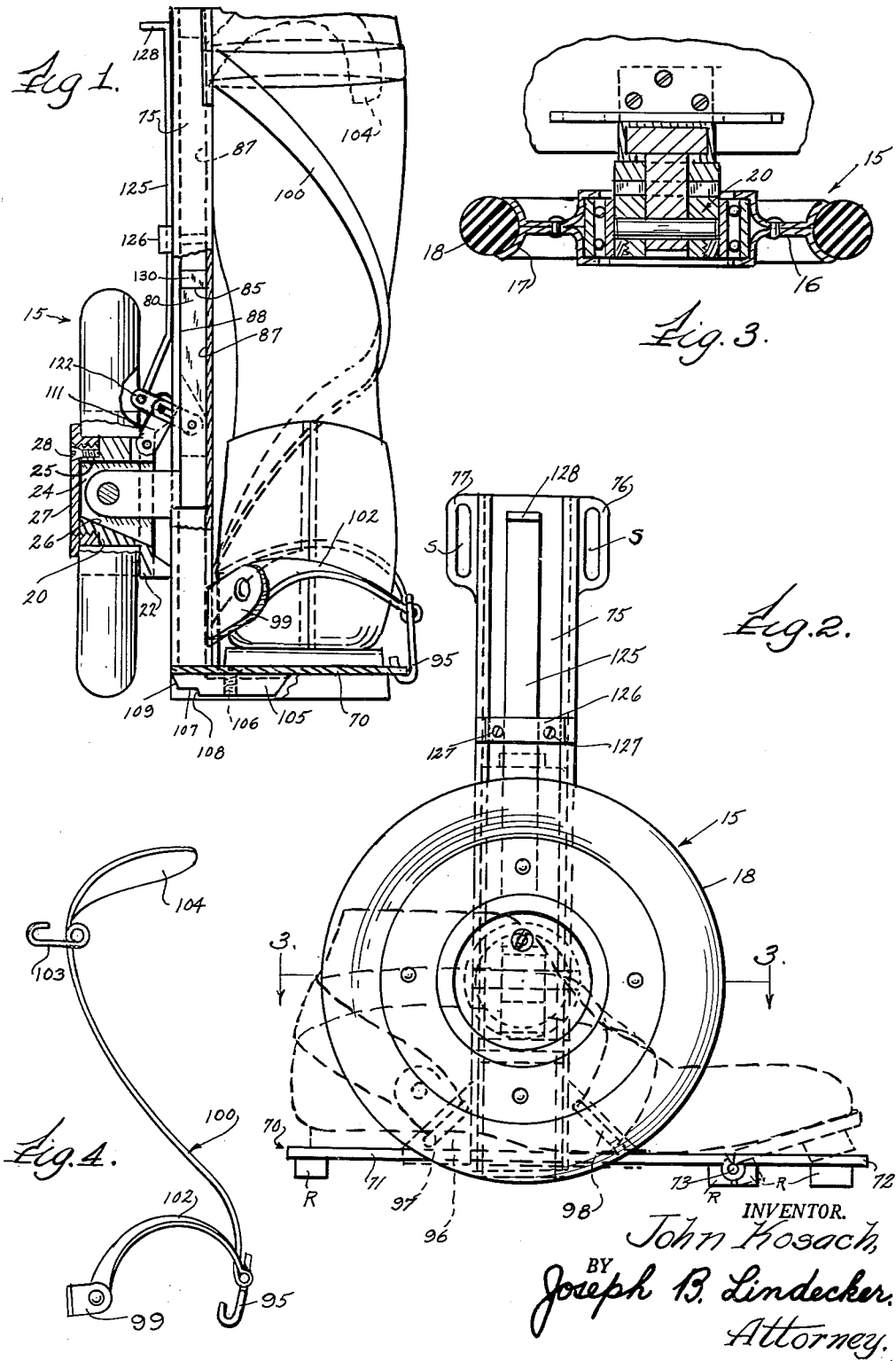
INVENTOR.
John Kosach,
BY Joseph B. Lindecker,
Attorney.

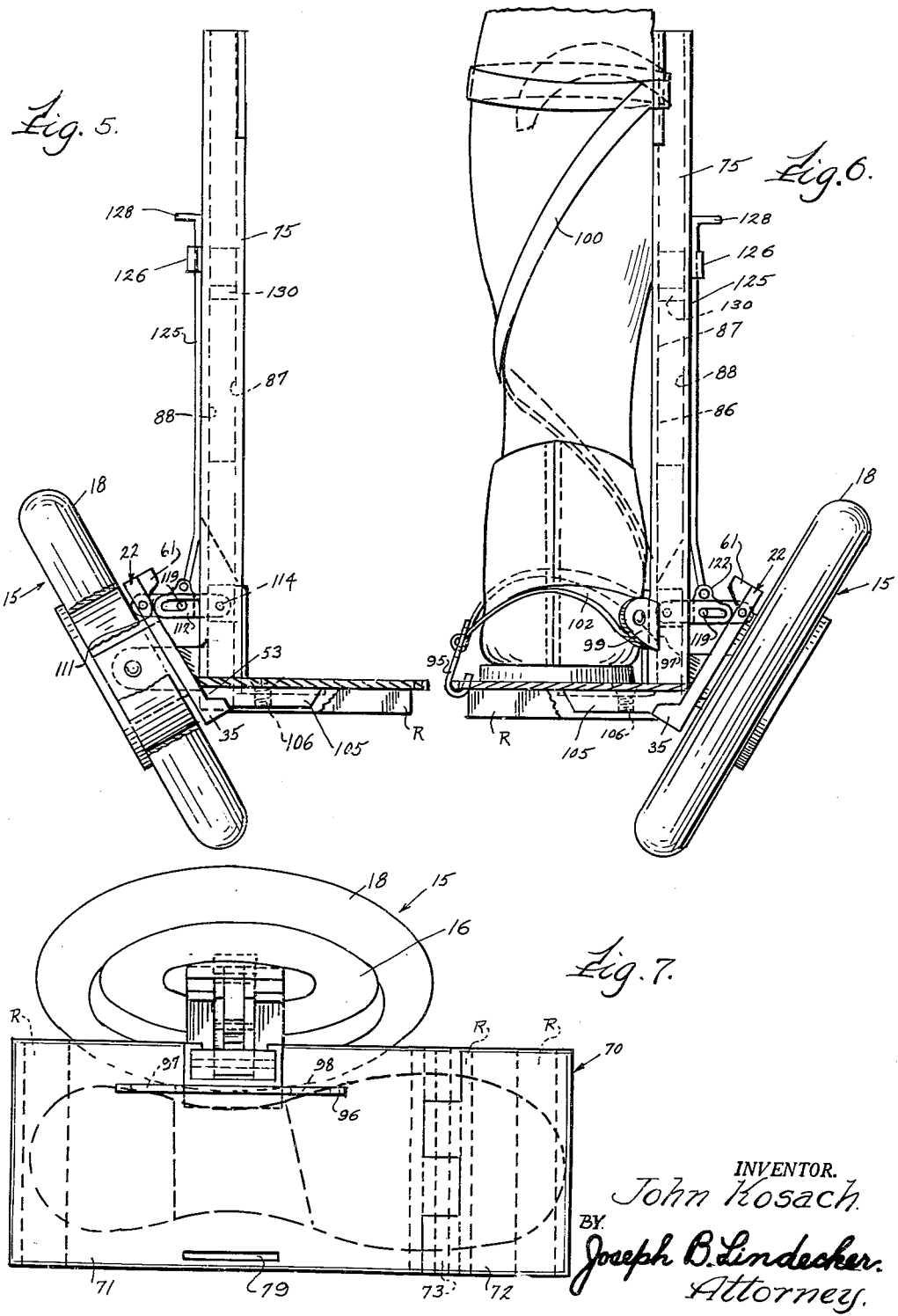

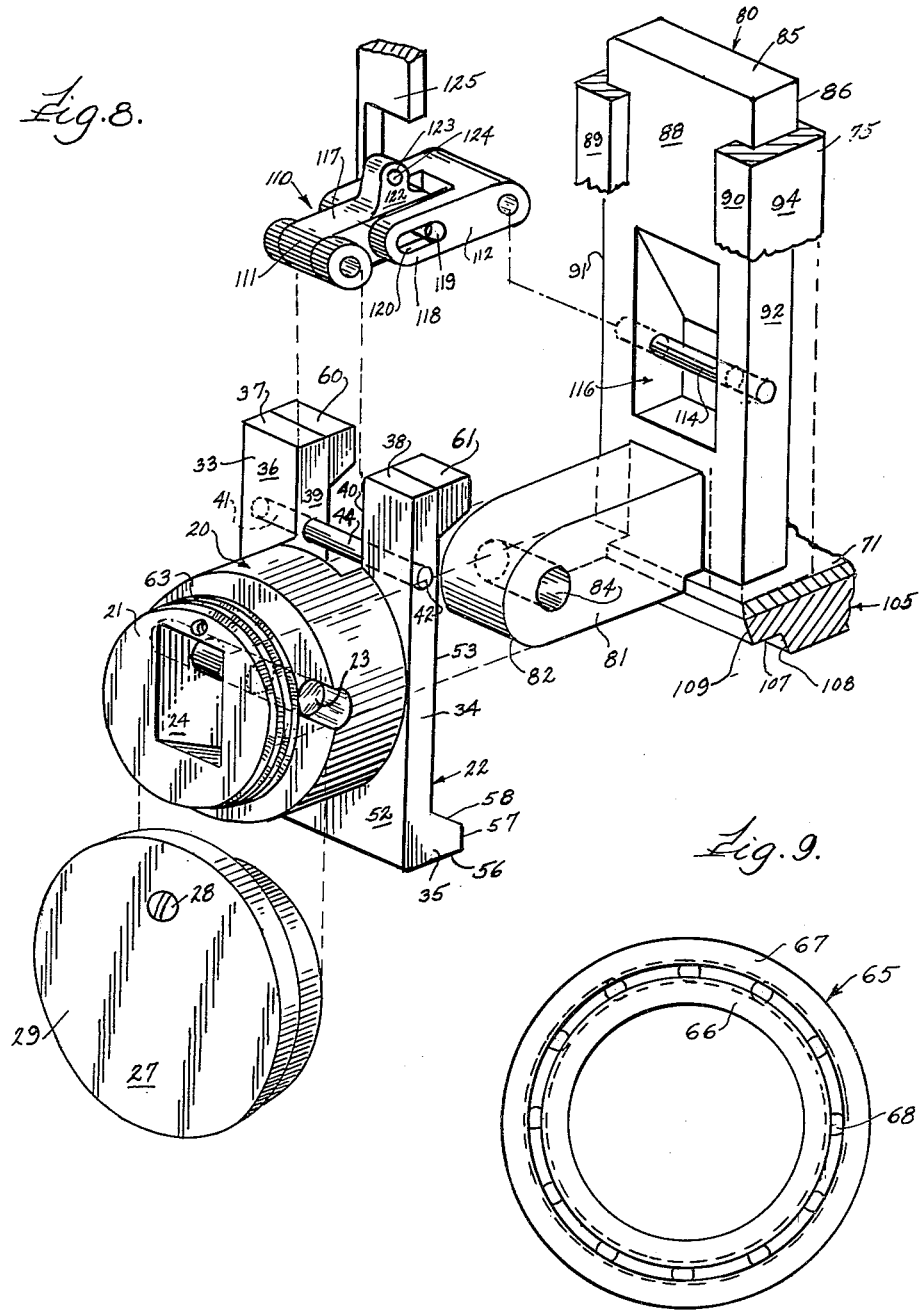

United States Patent Office 2,980,436
Patented Apr. 18, 1961

2,980,436

SINGLE WHEEL SKATE

John J. Kosach, 5022 W. Lawrence Ave., Chicago, Ill.

Filed June 6, 1960, Ser. No. 34,055

11 Claims. (Cl. 280—11.24)

This invention relates to a vehicle and more particularly to a single wheel skate for use on roads, sidewalks, rinks and the like.

The invention embraces the provisions of a vehicle, or a single wheel skate which may be attached to the feet of a person whereby the person can more easily make turns than upon the multiple wheel type skates.

An object of the invention is the provision of a single wheel skate of light weight construction particularly adapted for skaters upon which they may travel at greater speeds with greater safety and comfort than on those which are now in general use.

Another object of the invention is the provision of a single wheel skate which is adjustable, affords sufficient room for the skater's foot and at the same time allows the wheel to be raised or lowered so that the base of the skate can be in contact with the ground, or at a short distance above the ground, the said distance being less than one-half the diameter of the wheel, and held in either position by permanent magnets.

Another object of the invention is the provision of a single wheel skate which is adjustably mounted relative to the base, or foot supporting member, of the skate allowing the wheel to be set at the desired inclination with the vertical affording the speed position desired to be obtained by the skater.

Another object of the invention is the provision of a single wheel skate in which the wheel is adjustably mounted vertically on the foot supporting member of the skate, allowing the wheel to be elevated above the ground, the supporting member consisting of two parts hingedly connected together and having rubber blocks attached thereto so the user may walk when and where he desires without the wheel being in contact with the ground.

Another object of the invention is the provision of a single wheel skate embodying a metallic foot support, a metallic vertical channel-shaped upright leg supporting member rigidly connected thereto, a metallic adjustable bar member, or device, of substantially rectangular configuration slidably mounted in the leg supporting member transverse lateral ears being provided on the front and rear portions of the leg supporting member at the upper end thereof, and openings in each of said ears providing means whereby leg holding straps may be connected therewith for securing the leg supporting member to the leg of the skater.

A further object of the invention resides in the construction of a single wheel skate designed for the reception of a solid rubber tire, or a pneumatic tire, of desired diameter of the tire to suit the requirements of different skaters or other special services for which the wheel is desired.

A still further object of the invention resides in a single wheel skate where a relatively large diameter wheel is angularly supported by a journal on the foot support plate, the plate being designed and assembled to be suspended at, or below the axis of the wheel thereby providing smooth operation of the skate when the wheel is in use, and providing for walking when the wheel is out of contact with the ground and elevated above the foot support plate.

Further objects and advantages are within the scope of this invention such as relate to the arrangement, operation and function of the related elements of the single wheel skate, to various details of construction and to the combination of parts and magnetic units, elements per se, and to economics of manufacture and numerous other features as will be apparent from a consideration of the specification and drawing of a form of the invention, which may be preferred, in which:

Figure 1 is a rear view of the left skate constructed in accordance with an embodiment of my invention, parts shown in section, and the left leg and the left foot of a user shown strapped to the skate, the wheel of the skate being elevated so the foot plate thereof will contact the ground for use in walking;

Figure 2 is a view in side elevation of the right skate, embodying the invention show in Fig. 1, the foot of the user being shown dotted in contact with the foot plate of the skate;

Figure 3 is a plan sectional view of a fragmentary portion of the skate of this invention taken on line 3—3 of Fig. 2;

Figure 4 is perspective view of one of the straps with hooks, forming a part of this invention;

Figure 5 is a view in rear elevation of the left skate as disclosed in Fig. 1 unapplied, with the wheel assembly in lowermost position and inclined to the vertical and with parts of the wheel assembly in section;

Figure 6 is a view in rear elevation of the right skate of my invention applied to the leg and foot of the user, with the wheel assembly in lowermost position and inclined to the vertical;

Figure 7 is a top plan view of the skate as disclosed in Fig. 5 unapplied, the position of the user's foot being shown by dotted lines;

Figure 8 is an exploded perspective view of the transverse wheel supporting member of the skate, disclosing the locking parts associated therewith, parts shown in section; and Figure 9 is an enlarged face view of one of the wheel bearings as used therewith.

While I have illustrated a form of my invention as embodied in a single wheel skate, it is to be understood that I contemplate the application of the principles of my invention to any one wheel form of vehicle.

Referring to the drawing in detail, the vehicle construction illustrated is inclusive of a single wheel 15 assembled with each skate; each wheel is provided with a central ring 16, the outer periphery 17 of which is so shaped as to be adapted for the reception of the tire 18, best shown by Fig. 3. The wheel 15 is provided with a cylindrical hub portion 20 having a cylindrical cap supporting portion 21 of less diameter at its outer front end and having an integral apertured plate section 22 arranged normal to the central axis of said hub 20 at its inner rear end. Said hub portion 20 has a transverse horizontally arranged bore to receive a bearing pin 23, later to be described. Said hub portion 20 is also provided with a longitudinal cavity 24 of rectangular shape in vertical cross-section, having a flat horizontal, longitudinal upper wall surface 25 and a flat lower longitudinal wall surface 26 which extends rearwardly and downwardly, as shown by Figures 1 and 8. A hub cap 27 is removably secured by internal threads and screw 28 to the outer end of hub 20 to form an end wall 29 to lock the wheel in place and to close said cavity 24. The integral apertured plate portion 22 is substantially L-shaped and is provided with a central opening and two vertical edges 33 and 34, a leg portion 35 and a forked top portion 36, said top portion 36 embodying two vertical legs 37 and 38 spaced apart from each other and having parallel vertical inner side walls 39 and 40, said vertical legs 37 and 38 being bored transversely providing horizontal cylindrical pin holes 41 and 42 in horizontal alignment through which extends a locking type bearing pin 44, clearly shown by Fig. 8. The L-shaped plate section 22, with top portion 36 and leg portion 35, embodies a vertical flat outer wall surface 52 and a rear inner wall surface 53, the horizontal transverse lower wall 56 of said leg portion 35 being normal to said wall surface 52 and extending rearwardly away from said hub portion 20 a distance substantially twice the thickness of said top portion 36; said leg portion 35 is provided with an inner vertical wall 57 which extends transversely and normal to said lower wall 56. The upper transverse surface 58 of said leg portion 35 extends rearwardly and downwardly whereby said leg portion 35 is trapezoidal in vertical cross-section. The two legs 37 and 38 of the forked upper end portion 36 are each provided with rubber bumpers designated 60 and 61, said bumpers being identical and trapezoidal in vertical cross-section and rigidly secured to the rear inner surfaces of legs 37 and 38 and the inner vertical end wall surfaces thereof being directly above and in vertical alignment with said vertical wall 57 of said leg portion 35. The cap supporting portion 21 is provided with external male threads 63 to receive the internal threads of hub cap 27. As shown by Figures 3 and 9, the bearing 65 which supports the wheel 15 upon the hub portion 20, consists of a pair of inner ball races 66 and a pair of outer ball races 67, with a plurality of balls 68 therebetween.

The foot-plate 70 of each skate is of substantially rectangular configuration, as shown by Figures 1, 2, 5, 6 and 7, and consists of two parts, a heel portion 71 and a toe portion 72 hingedly connected to the heel portion by a transverse hinge pin 73, shown in Figures 2 and 7, said heel and toe portions having mating connecting edge portions formed as a hinge with a transverse, horizontal bore extending therethrough to receive said pin 73. The mating edges of said toe and heel portions 71 are chamfered to permit the toe portion 72 to move upwardly when the user is walking instead of skating, as shown in raised position in Fig. 2. The forward and rear extremities of said toe portions are each provided with transverse rubber pads R riveted thereto. The rubber pads R serve to yieldably absorb shocks and jars incident to the act of walking by the user when the single wheel is elevated above the ground.

Suitably fixed to the outside longitudinal edge portion of each skate is a vertical channel type leg supporting member 75 arranged intermediate the ends of said heel portion 71. The leg supporting member 75 is adapted to lie against the outer side of the leg of the user. The uppermost end of each of said members 75 has affixed strap and lock engaging tabs 76 and 77 arranged on opposite sides thereof and extending horizontally of the skate and adjacent the leg of the user, said tabs having vertical slots S arranged therein. The member 75 extends upwardly and terminates below the knee of the user whereby an adjustable strap may be fastened about the leg just below the knee to brace the ankle and foot. Slidably connected to and within the leg supporting member 75 is a wheel supporting device 80, carrying at its lower end an outwardly extending supporting arm 81 of substantially rectangular, vertical cross-section; said arm 81 being semi-cylindrical at its outer free-end portion 82 and embodying a horizontal transverse cylindrical bore 84 therein for the reception of bearing pin 23 described above. The side walls of said forward free end portion 82 are in sliding contact with the side walls of said cavity 34, the inclined wall surface 26 permitting the hub portion and wheel thereon to pivot upon the bearing pin 23 supported in bore 84 of supporting arm 81. The supporting device 80 is a substantially solid elongated bar of rectangular cross-section with a solid top end wall 85. The inner wall 86 of said bar is in sliding contact with the inner surface 87 of said channel member 75. The outer wall 88 of said bar is in sliding contact with the inner surfaces of the inwardly extending flanges 89 and 90 formed on the side rails of the channel 75. The side walls 91 and 92 of said bar are in sliding contact with the vertical inner surfaces of the vertical rails 94 of said channel 75. Directly opposite said supporting member 75 is formed a vertical, longitudinal slot 79 in the heel portion 71 of foot plate 70, adapted to receive a strap hook 95. As shown by Figures 1, 2 and 6, a plate type bracket 96 with inclined upper edge walls is secured to the closed side and bottom portion of said channel supporting member 75 and to the adjacent longitudinal edge of said heel portion 71. The bracket 96 has an elongated slot 97 at the rear and a strap slot 98 at the front thereof adjacent the inclined edges thereof. A strap terminal end swivel member 99 is secured within said slot 97 and pivotally secured to a strap 100. A short section 102 of the strap extends about the heel of the user and a hook 95 is pivotally and movably arranged therewith, the hook 95 being adapted to be inserted in slot 79; the strap is then extended over the instep of the user and passed through said slot 98, then upwardly and back around the calf of the leg of the user. A hook 103 is attached to strap 100 and extends through slot S in tab 77, then the strap is extended around the back of the leg and around the front of the leg and through slot S in tab 76, then the opposite free terminal end 104 of the strap 100 is tucked between the strap 100 and the front portion of the leg of the user, where it is securely held. The strap and hooks and associated parts are identical on both skates and are designated by the same numerals.

When the wheel 15 is arranged to extend below the foot plate 70, the wheel is inclined to the vertical and must be secured in this usable, inclined position. A permanent magnet 105 is transversely secured to the bottom of the foot plate 70 by set screw 106. The one end of said magnet 105 adjacent the wheel is formed with a recessed horizontal wall portion 107 and two angular end walls 108 and 109; said walls 109, 107 and 108 mating with wall surfaces 53, 58 and 57, respectively. By reason of this arrangement, the plate section 22 is adapted to be attracted magnetically to the magnet 105, since the various surfaces of the leg portion 35 overlie opposite faces of the magnet 105, whereby the wheel 15 is magnetically held in an inclined position while in use. In order to lock the wheel 15 in operative, inclined position a locking device 110, clearly shown by Figures 1, 5 and 8, is assembled between the channel leg supporting member 75 and the forked top portion 36. Said locking device 110 consists of two toggle links 111 and 112 pivotally connected together. As shown by Figures 1 and 8, the link 111 is pivotally connected to pin 44 extending between legs 37 and 38 of plate 22. The link 112 is pivotally connected to a cylindrical rod 114 arranged in the wheel supporting device 80, said device having an aperture 116 extending therethrough from the outer wall 88 to the inner wall 86, the device 80 having said cylindrical rod 114 extending therethrough from side wall 91 to side wall 92, and extending transversely through said aperture 116, whereby the end of link 112 pivots on rod 114 within aperture 116. The opposite end of link 111 has a tongue 117 which extends into the bifurcated end 118 of link 112 and is pivotally connected thereto by means of a pin 119 arranged in a transverse bore in link 111 and riding within a pair of slots 120 in the bifurcated ends 118. The top side of tongue 117 is provided with a transverse boss 122 provided with a transverse bore 123, and pin 124 in said bore 123. The pin 124 extends beyond one side of said boss 122 and is pivotally mounted within the bottom end of pull rod 125; said rod 125 extends upwardly along the open side of channel member 75 passing through a support bracket 126 secured to channel 75 by screws 127. The upper end of said rod 125 terminates adjacent the top end of said channel member 75 and is formed with a hand gripping flange 128. By pulling upwardly on rod 125 it breaks the locking device 110 intermediate its ends, allowing the wheel 15 to assume a vertical position whereby the wheel 15 and supporting device 80 may be raised to elevate the wheel 15 above the ground. The reverse, or downward movement of rod 125 forces the wheel 15 into an inclined position and locks it in place, since it is normally held in the inclined position by magnet 105 when the supporting device 80 is in its lowermost position and allowing the wheel 15 to contact the ground. When it is desired to walk with the skate, with wheel 15 in elevated position, the support device 80 is raised, as described, the top surface 85 thereof coming into contact with a permanent magnet 130 rigidly secured within the channel member 75 and between the vertical rails 94 thereof. The permanent magnet 130 will retain the wheel 15 off the ground when raised therefrom. The permanent magnet 105 will retain the wheel 15 in locked inclined position when the user is skating in a normal manner.

When the skates are used in walking, the supporting device 80 is elevated and held in uppermost position by magnet 130, and the leg portion 35 is horizontal with the inner vertical wall 57 thereof in contact with the outer surfaces of the inwardly extending flanges 89 and 90 of channel member 75. The resilient rubber bumpers are also in contact with the said flanges 89 and 90, thereby preventing any free movement between the plate 22 and the channel member 75.

The manner of securing the skates to the feet and legs of the user, by a single strap attached to each skate, is believed to be very advantageous.

From the foregoing it is thought that the construction and manner of use of the vehicle will be clearly understood, and therefore a more extended explanation has been omitted.

While it will be apparent that the illustrated embodiments of my invention herein disclosed are well calculated to adequately fulfill the objects and advantages primarily stated, it is to be understood that the invention is susceptible to variations, modification and change within the invention comprehending all variations thereof.

I claim as my invention:

1. In an inclined single wheel road skate, the combination of the wheel proper, a wheel support having a horizontal extending arm, said arm having a transverse bore in the outer end portion thereof, said wheel having a hub portion, a transverse bore in said hub portion in alignment with said bore in said arm, a bearing pin extending through said bores in said hub portion and said arm pivotally supporting said wheel upon said arm, a foot-plate, a vertical channel type leg support attached to and extending above said foot-plate, said hub portion having an integral apertured plate section arranged normal to the central axis thereof at its inner end, said wheel support slidable vertically within said channel type leg support, said wheel movable between an inclined operative position, and a vertical inoperative position, and a permanent magnet transversely attached to the bottom of said foot-plate with one end thereof adjacent said wheel whereby the lower end portion of said integral apertured plate section of said hub portion is attracted magnetically to said magnet attached to said foot-plate to hold said wheel in an inclined operative position.

2. The single wheel road skate according to claim 1 including a second permanent magnet, said second magnet rigidly secured in said channel and arranged between the vertical side walls of said channel type leg support, said second magnet in said channel contacting the upper end of said wheel support when raised to its uppermost position to hold said wheel in a vertical non-operative position.

3. In a vehicle of the class described the combination of an inclined single wheel, an axle hub extending outwardly from one side of said wheel, a wheel support having a vertical portion and a horizontal extending arm, a foot-plate, a vertical channel type leg support secured normal to and extending above said foot-plate, said vertical portion of said wheel support slidable vertically within said channel type leg support, and the outer end of said horizontal extending arm pivotally connected with said axle hub by pivotal means extending transversely through said axle hub whereby said wheel is angularly movable relative to said leg support.

4. The vehicle according to claim 3 including an integral apertured hub plate section arranged normal to the central axis of said hub and formed on the inner end thereof, a permanent magnet attached to said foot-plate with one end thereof adjacent said wheel whereby the lower end portion of said integral apertured hub plate section is attracted magnetically to said magnet attached to said foot-plate to hold said wheel in an inclined operative position.

5. The vehicle according to claim 4 including a second stationary permanent magnet arranged within the upper end portion of the channel portion of said leg support, said second magnet contacting the upper end of said wheel support when raised to its uppermost position to hold said wheel in a vertical non-operative position.

6. An inclined single wheel road skate consisting of the combination of a disc-shaped wheel and rubber tire thereon, a wheel hub, a bearing mounted between said hub and said wheel, said hub extending outwardly from one side of said wheel, said hub having a cavity in the central portion thereof, a foot-plate, a channel type leg support secured normal to said foot-plate and extending upwardly therefrom, a wheel support slidable vertically within said leg support and having a horizontal extending arm, said arm having a pivot pin horizontally arranged in the outer end portion thereof, said hub having a pair of horizontally aligned bores therein and in communication with said cavity therein, said pivot pin movably connecting the outer end of said arm within said cavity whereby said wheel is angularly movable relative to said leg support, support means attached to said foot-plate to hold said wheel in an inclined position when used as a skate, and means secured within the upper end portion of said channel type leg support to hold said wheel support in its uppermost location when said wheel is raised above the ground.

7. The inclined single wheel road skate according to claim 6 wherein said wheel hub portion embodies an integral apertured plate section arranged normal to the central axis thereof at its inner end, and said support means includes a stationary permanent magnet attached to the bottom of said foot-plate with one end thereof adjacent said wheel whereby the lower end of said hub plate section is attracted magnetically to said magnet to hold said wheel in an inclined operative position for rotation upon the ground.

8. The single wheel road skate according to claim 7 including a second stationary permanent magnet attached to and within the upper section of said leg support, said second magnet contacting the upper end of said wheel support when it is raised to its uppermost position for holding said wheel support in an elevated position whereby said wheel is maintained in an inoperative vertical position above the horizontal plane passing through said foot-plate.

9. The single wheel road skate according to claim 8 wherein a locking device is assembled between said leg support and said plate section to lock said wheel in position when in inclined position, said locking device consisting of two toggle links pivotally connected together at adjacent ends, the other end of one link pivotally connected with said plate section, the other end of the second link pivotally connected with said wheel support, a pull rod connected with said locking device whereby the joined ends of said links may be raised allowing said plate section to be moved adjacent to said leg support to allow said wheel to be held in a vertical inoperative position.

10. In a vehicle of the class described the combination of a wheel, a hub for said wheel, bearing means arranged between said hub and said wheel, a foot-plate, a leg supporting channel member attached to one side of said foot-plate and extending upwardly therefrom at right angle therewith, a wheel supporting bar, said bar slidably and vertically mounted within said channel member and having a horizontal, outwardly extending arm with a free end, said free end of said arm pivotally connected with said hub by a horizontal pin extending through horizontally aligned bores in said hub, a metal plate section of L-shape configuration secured to the inner end portion of said hub and arranged normal to the central axis thereof, said plate section having a lower leg portion and a pair of upwardly extending forked arms at the top thereof, said arms having rubber bumpers secured to the rear sides thereof and adapted to contact said channel member when said plate section is in a vertical position, a permanent magnet secured to the base of said foot-plate tending to hold said lower leg portion of said plate in contact therewith and said wheel in an inclined position, a locking device consisting of two toggle members, said toggle members pivotally connected together at adjacent ends, the opposite end of one toggle member pivotally connected to and between said arms at the top of said plate, the second toggle member pivotally connected to the upper portion of said wheel supporting bar, said toggle members when in alignment tending to hold said plate section away from said channel member, said toggle members when elevated at their junction point tending to permit said lower leg portion to slide upon the vertical outer surface of said channel member with said rubber bumpers also in contact with said channel member, whereby said plate and said wheel may be moved vertically, strap means for securing the foot of the user to said foot-plate and the leg of the user to said channel member, said strap means comprising a strap secured at one end to a bracket on the heel portion of said foot-plate, a plurality of hooks mounted upon said straps adapted to be inserted in slots in said channel member and the free end of said strap adapted to be inserted through said slots in said channel member.

11. The vehicle according to claim 10 further embodying a stationary permanent magnet mounted and secured within said channel member intermediate the ends thereof adapted to contact and hold said wheel supporting bar in an elevated position when said wheel is elevated above the foot plate and said foot plate is allowed to contact the ground.

References Cited in the file of this patent

UNITED STATES PATENTS

| | | |
|---|---|---|
| 1,023,882 | Schiesari | Apr. 23, 1912 |
| 2,208,888 | Whited | July 23, 1940 |
| 2,802,693 | Lauve | Aug. 13, 1957 |
| 2,931,012 | Kosach | Mar. 29, 1960 |

FOREIGN PATENTS

| | | |
|---|---|---|
| 4,752 | Great Britain | Apr. 23, 1903 |
| 69,010 | Switzerland | May 17, 1915 |
| 313,449 | Germany | July 14, 1919 |
| 753,203 | France | Aug. 7, 1933 |